US008808079B2

(12) United States Patent
Williams et al.

(10) Patent No.: US 8,808,079 B2
(45) Date of Patent: Aug. 19, 2014

(54) LOTTERY GAME REWARD SYSTEM AND METHOD

(75) Inventors: Ron E. Williams, Cumming, GA (US); Robert H. Arnold, Sandy Springs, GA (US)

(73) Assignee: Scientific Games International, Inc., Newark, DE (US)

( * ) Notice: Subject to any disclaimer, the term of this patent is extended or adjusted under 35 U.S.C. 154(b) by 310 days.

(21) Appl. No.: 12/756,409

(22) Filed: Apr. 8, 2010

(65) Prior Publication Data

US 2010/0267438 A1 Oct. 21, 2010

Related U.S. Application Data

(60) Provisional application No. 61/169,745, filed on Apr. 16, 2009.

(51) Int. Cl.
*A63F 9/24* (2006.01)
*G06F 17/00* (2006.01)

(52) U.S. Cl.
USPC .............................................. 463/17; 463/25

(58) Field of Classification Search
USPC ...................................................... 463/17, 25
See application file for complete search history.

(56) References Cited

U.S. PATENT DOCUMENTS

| | | | | |
|---|---|---|---|---|
| 4,764,666 | A | 8/1988 | Bergeron | |
| 5,158,293 | A * | 10/1992 | Mullins | 273/139 |
| 5,491,326 | A | 2/1996 | Marceau et al. | |
| 6,189,787 | B1 * | 2/2001 | Dorf | 235/380 |
| 6,244,958 | B1 | 6/2001 | Acres | |
| 6,868,955 | B2 * | 3/2005 | Mikami et al. | 194/350 |
| 2004/0176158 | A1 * | 9/2004 | Baldwin | 463/17 |
| 2005/0149393 | A1 * | 7/2005 | Leof | 705/14 |
| 2006/0277100 | A1 * | 12/2006 | Parham | 705/14 |
| 2008/0103909 | A1 * | 5/2008 | Huang et al. | 705/14 |
| 2008/0174068 | A1 * | 7/2008 | York et al. | 273/139 |
| 2008/0242399 | A1 * | 10/2008 | Toneguzzo | 463/25 |
| 2009/0061992 | A1 | 3/2009 | Boykin et al. | |

FOREIGN PATENT DOCUMENTS

| | | |
|---|---|---|
| WO | WO 2008/052038 | 5/2008 |
| WO | WO 2008/073346 | 6/2008 |

OTHER PUBLICATIONS

Tennessee Lottery Website—Play It Again, Aug. 29, 2011.
PCT Search Report, June 25, 2010.

* cited by examiner

*Primary Examiner* — Dmitry Suhol
*Assistant Examiner* — Carl V Larsen
(74) *Attorney, Agent, or Firm* — Dority & Manning P.A.

(57) ABSTRACT

Systems and methods for conducting a lottery game that implements a lottery rewards program are disclosed. The system may include a terminal for providing a game ticket to a player for use in a lottery game play. The game ticket has a randomly assigned redemption point value assigned thereto. The redemption point value includes at least one redemption point for use in a lottery rewards program. The system includes a player interface configured to permit a player to enter game ticket data into the lottery gaming system. The system further includes a controller configured to determine whether the game ticket is a winning game ticket eligible for the payout value of the lottery game play and to award the redemption point value of the game ticket to the player when the game ticket is not a winning ticket. In this manner, the rewards program of the present invention permits players to redeem or collect rewards even if the player loses the lottery game.

14 Claims, 5 Drawing Sheets

Figure 7
Welcome to the Reward Store!
You Can Use Chips To...
640
Buy Great WPT Merchandise
OR
Enter Drawings to win incredible WPT Trips!
630
Click Here
Click Here

LOTTERY GAME REWARD SYSTEM AND METHOD

PRIORITY CLAM

The present application claims priority to U.S. Provisional Application Ser. No. 61/169,745, filed Apr. 16, 2009.

BACKGROUND

Lottery or wagering games are well known wherein players place a wager on the outcome of an event, such as a random selection of numbers, objects, or other indicia, and the wager is won or lost depending on the outcome of the event. For example, in a typical lottery game such as a Pick-3 or Pick-4 game, players may place a wager and designate particular picks or selections from a defined field of numbers or other indicia. Alternatively, the player may opt for a "quick-pick" option wherein their selections are randomly generated by the lottery system. At a subsequent drawing, the lottery gaming authority randomly generates (for example, by mechanical, electrical, or software generation) a "winning" set of game numbers from the field, and a player "wins" if their picks match all or some combination of the winning numbers.

Other types of lottery or wagering games include instant "scratch-off" lottery games. In these games, a player purchases an instant "scratch-off" ticket embodying a single play of a particular instant "scratch-off" lottery game. The player then scratches off certain fields on the ticket according to the rules of the game. A player "wins" if one or more of the scratched-off fields reveal a winning event.

The industry is continuously seeking ways to generate player interest and excitement in the gaming experience. For instance, the instant "scratch-off" games can have various themes to make the instant "scratch-off" games more entertaining to players. For instance, the games may relate to, for example, professional sports teams, organizations, game shows, tv shows, or other themes. The games are typically sanctioned or licensed by the organizations that own the various intellectual property rights associated with the games, for example, logos, trademarks, or other intellectual property. NASCAR® licensed instant lottery games are a well known example of a sponsored or licensed game. Such games have wide appeal to the avid fans and supporters of the organization, and may be preferred by retailers and lottery promoters for this reason alone.

Bonus features have also been introduced into lottery games to make the games more attractive to players. In a typical scenario, the player purchases the bonus feature option upon placing their initial wager for the lottery game. If the player wins a prize amount in the game, the bonus feature may increase the prize amount by a predetermined factor, or a randomly generated factor that is determined at the time of the lottery game. A well known version of this concept is the Powerball® lottery game with the Power Play option.

A primary motivation for players to play a lottery game is the possibility the player may win a prize such as a cash prize, merchandise prize, gift certificate, travel package or other prize after playing the particular lottery game. However, players may become discouraged from playing the lottery games if the player never wins the game prize. The present invention provides a unique rewards program that encourages players to participate in lottery games by permitting the player to redeem or collect rewards even if the player loses the lottery game.

SUMMARY

Objects and advantages of the invention will be set forth in part in the following description, or may be obvious from the description, or may be learned through practice of the invention.

In one aspect of the present invention, a lottery game system for implementing a redemption points based lottery rewards program is provided. The system includes a terminal for providing a game ticket to a player for use in a lottery game play. For example, the game ticket may be for use in a lottery drawing or for use in an instant "scratch-off" lottery game. The lottery game provides a payout value for winning game tickets. The payout value may include a cash prize, or, in the alternative may include prizes such as merchandise, gift certificates, travel packages, or other prizes.

In a particular embodiment, each game ticket issued for the lottery game is assigned a redemption point value. This value may be randomly assigned from a range of values, or may have a pre-determined value. The redemption point value includes at least one redemption point for use in a lottery rewards program. In certain embodiments, the redemption points may be exchanged through the rewards program for merchandise, gift certificates, travel packages, or other prizes. Alternatively, the redemption points may be exchanged for entries into additional lottery games.

As mentioned, the redemption point values of each game ticket may be randomly assigned to the game ticket. In one embodiment, the redemption point value may be randomly assigned from a pre-set range of redemption point values associated with the game ticket. The pre-set range of redemption point values associated with the game ticket may be dependent on, for example, the purchase price of the game ticket. For instance, a more expensive game ticket may have a higher range of redemption point values associated therewith. In this manner, players may be encouraged to purchase more expensive game tickets because of the potential for higher redemption point values to be associated with the game ticket.

The gaming system of the present disclosure further includes a player interface configured to enter game ticket data into the lottery gaming system. Based on the entered game ticket data, the system is configured to determine whether the game ticket is a winning game ticket eligible for the payout value of the lottery game play. The system is further configured to award the redemption point value of the game ticket to the player when the game ticket is not a winning ticket. The system includes a database configured to store the redemption points of the player.

In particular embodiments, the player interface is configured to permit the player to monitor or track the number of redemption points awarded to the player that are stored in the redemption point database. For example, the player may access the lottery game system via a secure website. After logging in to the secure web site, the player may view the number of redemption points the player has accumulated. The player interface system may be configured to allow the player to exchange the redemption points for various items including, for example, merchandise, gift certificates, travel packages or other items. In other embodiments, the redemption points may be exchanged for entries into additional lottery games. For instance, the redemption points may be exchanged for entries into a drawing for a grand prize or into sweepstakes style lottery game.

In one particular embodiment, the game ticket is for use in an instant "scratch-off" type lottery game wherein each game ticket embodies a single play of the instant lottery game. The instant lottery game has a prize structure in which a prize from the instant lottery game is reserved as a final prize for the instant lottery game. The player interface is configured to permit the player to exchange redemption points for entries in a drawing for the final prize of the instant lottery game.

The redemption points of the present invention may be used to provide incentive for players to perform a variety of actions or motivate players to make preferred purchase decisions. The redemption points act as reward for certain actions or a purchase decisions made by the player. For example, the game system of the present invention may be used as part of an anti-littering program. In this embodiment, the controller of the central lottery server is configured to award redemption points to the player when the player physically returns the game ticket to the lottery terminal. In this manner, players are encouraged to return game tickets to the lottery terminal instead of disposing them in various areas as litter. In other embodiments, "double" or "triple" redemption points may be awarded to encourage preferred actions or purchase decisions by the player.

Another aspect of the present invention relates to a gaming method for implementing a redemption points lottery rewards program. The method includes issuing a game ticket to a player; randomly assigning a redemption point value to the game ticket, the redemption point value comprising at least one redemption point for use in the lottery rewards program; receiving game ticket data, the game ticket data used to determine the redemption point value assigned to the game ticket; determining if the game ticket is a winning game ticket eligible for the payout value of the lottery game play; awarding the redemption point value of the game ticket to the player when the game ticket is not a winning ticket; and storing the awarded redemption points of the player in a redemption point database.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
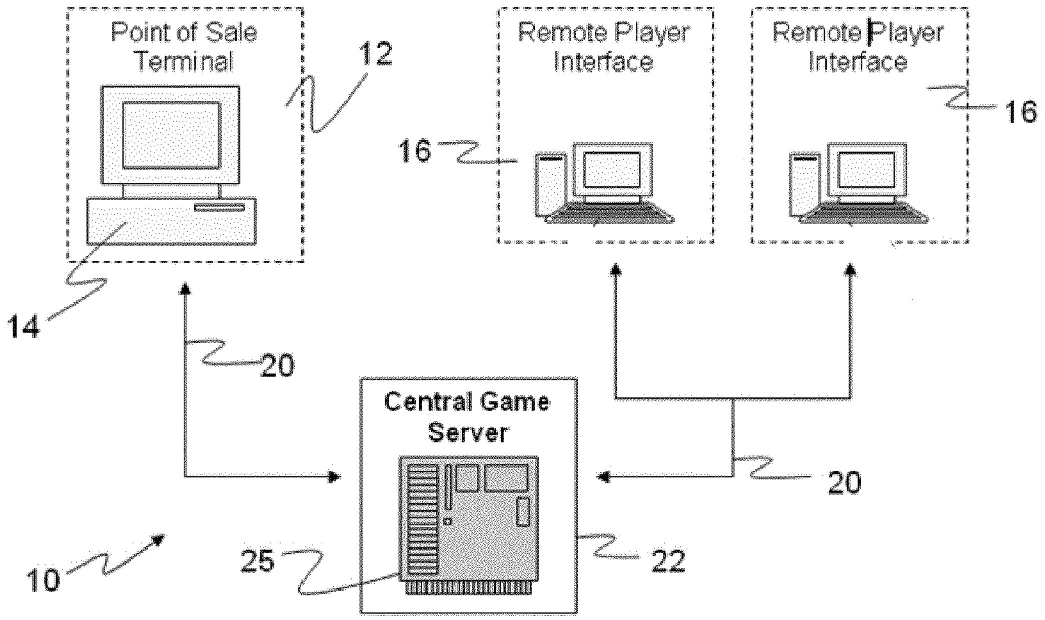
FIG. 1 depicts a schematic line drawing illustrating conceptual aspects of a system according to one embodiment of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the other computer uses to access the actual data from a still further computer.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable lottery gaming systems. Such system(s) may comprise one or more computing devices adapted to perform one or more embodiments of the methods disclosed herein. As noted above, such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

In general, the present disclosure is directed to systems and methods for conducting a lottery game that implements a lottery rewards program. As discussed more fully herein, the system may include a terminal for providing a game ticket to a player for use in a lottery game play. The game ticket has a randomly assigned redemption point value assigned thereto. The redemption point value includes at least one redemption point for use in a lottery rewards program.

The system includes a player interface configured to permit a player to enter game ticket data into the lottery gaming system. The system further includes a controller configured to determine whether the game ticket is a winning game ticket eligible for the payout value of the lottery game play and to award the redemption point value of the game ticket to the player when the game ticket is not a winning ticket. In this manner, the rewards program of the present invention permits players to redeem or collect rewards even if the player loses the lottery game.

FIG. 1 depicts a schematic line drawing illustrating conceptual aspects of a system 10 according to one embodiment of the present invention. The system 10 includes a point of sale location 12 where game tickets are sold to players of a lottery game. Point of sale location 12 includes terminal 14 for selling and issuing game tickets 14. FIG. 1 illustrates a single terminal 14. However, it should be readily appreciated that the system 10 may include a vast number of terminal units 14 operatively coupled to a lottery network.

The lottery network may, in turn, be in communication with the central gaming authority 22, and particularly with the central game server 25 via any suitable communications network 20. For example, in a particular embodiment, the lottery network may include a state lottery system operating within an individual state or region of states, wherein the lottery terminal units 14 are interconnected to the state lottery gaming authority.

The terminals 14 may include any conventional feature known to those skilled in the art related to lottery terminals. The terminal 14 includes features and functionality to allow a player or retail clerk to enter the information required to participate in the lottery game. An exemplary terminal 14 includes a housing, one or more input devices, which may be a control panel having input keys, a display, a value input device such as a card reader, a play slip or ticket reader, and a ticket printer. The play slip reader is typically configured to read user selection marks, bar codes, magnetically stored information, or any other desired input information. Control panel input keys allow the player or retail clerk to select the game to be played, input the value to be wagered, manually enter selected lottery characters, and input any other information necessary to play the lottery game. The terminal may include a display which may be an LCD, a CRT, or touch-screen capable of receiving and displaying information related to the game. The value input device may include any device that can accept value or a wager from a customer, such as a card reader or an optical currency collector. The value input device may be integrated with external devices, such as a cash register or other retail terminals, to exchange information necessary to receive and record the wagering transaction. The game ticket printer may be used to print or otherwise encode game tickets with information selected or required to play the lottery game. The printer may provide game tickets that reflect a player's selection, or complete lottery slips if the selection was generated automatically by the terminal. It should be readily appreciated that particular embodiments of terminals 14 are not meant as a limitation of the invention, and that embodiments of the present invention may encompass any configuration of features and functionality to allow initiation and playing of a lottery game.

Figure 2:
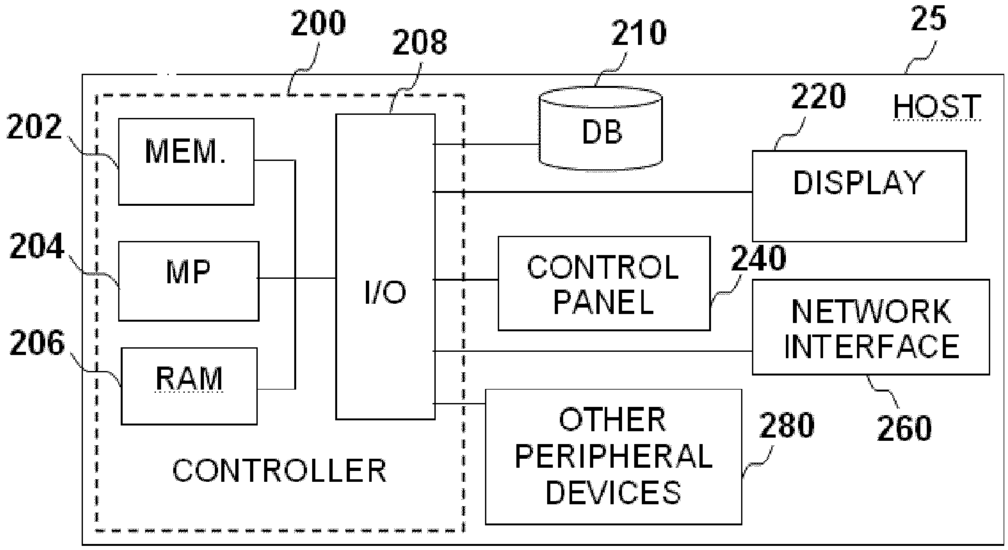
FIG. 2 provides a block diagram of an exemplary controller according to one embodiment of the present invention.

The central game server 25 may be a single networked computer, or a series of interconnected computers having access to the lottery system 10 or network via any suitable networking system. Generally, the central game server 25 is configured to manage, execute, and control the individual lottery terminals 14 and the routines used to play various lottery games. As shown in more detail in FIG. 2, the central game server 25 may include a controller 200 having a memory 202 for storing lottery programs and routines, a microprocessor 204 for executing stored routines, random access memory (RAM) 206, and an input/output (I/O) bus 208.

In addition, the central game server 25 may be in communication with any manner of external device, including external or internal databases 210. Such databases 210 may provide a data repository for the storage and correlation of information gathered from the individual lottery terminals 14 relating to the individual terminals, such as terminal specific information like the machine ID, sales establishment, location, and ticket-specific information. The databases may also include a redemption point database for storing awarded redemption points of a player. As illustrated, controller 200 may additionally be interfaced with external components such as a display 220, a control panel 240, a network interface device 260 and other peripheral devices 280. Examples of other peripherals device include, but are not limited to, storage devices, wireless adaptors, printers, and other components.

Referring back to FIG. 1, the system 10 includes a plurality of remote player interfaces 16 operatively connected to the lottery system. Remote player interface 16 may be any device that allows players to interact with the system 10. For instance, the player interface 16 can be a personal computer, desktop computer, notebook computer, personal digital assistant (PDA), WebTV (or other Internet only terminal), cell phone, screen phone, lottery terminal, or other known communication device. The player interface 16 is configured to execute one or more computer programs, such as an Internet browser program, to allow users to interact with the system 100. Player interface 16 preferably includes a visual display. The visual display may be a monitor or screen operatively connected to the system 10. Alternatively, the visual display may be incorporated into a web-browser configured to display multimedia content. For instance, a player may access the system 10 remotely via an Internet web-browser on player interface 16. A player may interact with the system 10 and view various aspects of the rewards program through the web-browser of player interface 16. For instance, a player may enter game ticket information or data into the system through player interface 16. In addition, a player may track the number of redemption points awarded to the player through player interface 16. The player interface 16 may also be used to affect an exchange of redemption points for merchandise, prizes, gift certificates, travel packages, or entries into additional lottery games.

In one embodiment, the player interface 16 is located at a point of sale location 12, and may even be a part of the terminal 14. In this embodiment, a player may interact with the system 10 while purchasing or receiving a game ticket. The system 10 may aid the player in making purchase decisions for particular lottery games. For example, a player may view the number of redemption points needed to affect an exchange for a particular item of merchandise or other prize. The player may then make a purchase decision at the terminal based on this information.

Figure 3:
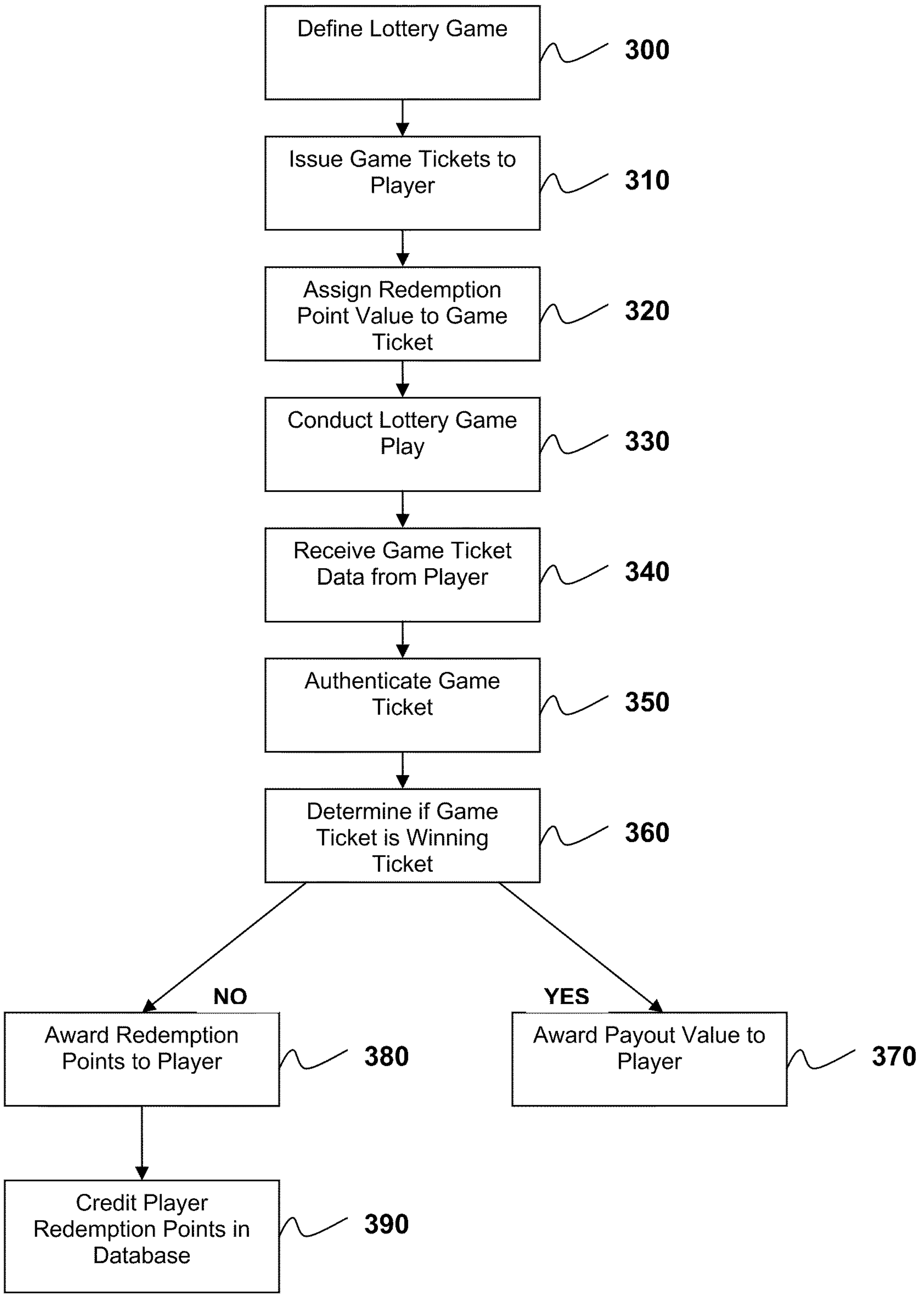
FIG. 3 provides a flow diagram of the exemplary steps associated with a method according to one embodiment of the present invention.

Referring now to FIG. 3, exemplary steps in accordance with one embodiment of a system and method of the present invention are now presented. At step 300, the lottery gaming authority defines a lottery game. The lottery game may be a game in which players place a wager on the outcome of an event, such as a random selection of numbers, objects, or other indicia, and the wager is won or lost depending on the outcome of the event. For example, the lottery game may be a Pick-3 or Pick-4 game in which players may place a wager and designate particular picks or selections from a defined field of numbers or other indicia. Alternatively, the lottery game may be an instant lottery game, such as an instant "Scratch Off" type lottery game. In an instant "Scratch Off" lottery game, game tickets representing a single play of the instant lottery game are issued to players. The players play the game by scratching off certain fields of the game ticket according to game rules to reveal if the game ticket is a winning game ticket. Using the teachings provided herein, those of ordinary skill in the art should understand the present invention is not limited to any particular type of lottery game. For instance, the lottery game may be a drawing type lottery game, instant lottery game, simple wager or bet, keno type lottery game, poker or playing card based lottery game, online lottery game, or any other type of lottery game.

The central lottery authority may define a prize structure for the lottery game that includes a payout value to a winner of the lottery game. The lottery game may provide a single payout value to a single winner, or may provide multiple payout values to multiple winners. Alternatively, the lottery game may split a single payout value among several winners of the lottery game. For example, an instant "scratch-off" lottery game may have multiple winning game tickets with each winning game ticket providing a different payout value to the player. The payout value may be a cash prize, or alternatively may be any of a variety of merchandise, gift certificates, travel packages or other prizes.

Still referring to FIG. 3, at step 310, game tickets are issued at a terminal for use in the lottery game. The game ticket is used by the player to participate in a lottery game play. For instance, in a draw type lottery game, the game ticket may include the selection of indicia wagered on by the player. In an instant lottery game, the game ticket may embody a lottery game play, with the player participating by scratching off certain fields of the game ticket to reveal a winning event. A payout value may be associated with the game ticket if the game ticket is a winning game ticket.

The game ticket may include game ticket information or data that is either printed on the ticket or otherwise associated with the ticket. The game ticket data may include ticket identification indicia, entry number indicia, product identification indicia, lottery game identification indicia, date of purchase indicia, authentication codes, terminal identification indicia, or a variety of other information or data that may be associated with the game ticket. The game ticket data may be physically printed on the game ticket or may be stored in a computer readable form on the ticket. In one embodiment, the game ticket information may be in the form of a bar code that can be scanned by the lottery system 10. The game ticket information may be used by the lottery system 10 to authenticate game tickets, to determine if the game ticket is a winning game ticket, or determine the redemption point value associated with the game ticket.

At step 320, a redemption point value is assigned to the game ticket. The value of the redemption points may be randomly determined, or have a defined value based on any number of factors. The redemption point value comprises at least one redemption point to be used in the lottery rewards system. As discussed in greater detail below, redemption points may be exchanged by the player for merchandise, gift certificates, travel packages or other prizes or may be exchanged for entries into additional lottery games.

The redemption point value may be assigned to the game ticket either before or after the game ticket is issued to the player. For instance, in one embodiment, the redemption point value is assigned to the game ticket as the game ticket is being issued from a terminal 14. In other embodiments, the redemption point values are pre-assigned to all game tickets as part of a pre-defined prize structure for a lottery game. In still other embodiments, the redemption point value may be assigned as a player inputs game ticket data into the lottery system 10 through a player interface 16.

The redemption point value for each game ticket may be randomly assigned, as discussed above. For instance, certain game tickets may be assigned a redemption point value of 10 redemption points, while other game tickets are assigned redemption point values of 1 and 25 redemption points respectively. The number of redemption points assigned to a particular game ticket may be determined by the controller 200 as part of a predetermined prize structure for the lottery game. Alternatively, the number of redemption points assigned to the particular game ticket may be determined randomly by a random generator.

In particular embodiments, the redemption point value is randomly assigned from a pre-set or pre-defined range of redemption point values associated with a particular game ticket. For example, a predefined range of redemption point values of 10 to 25 redemption points may be associated with a particular game ticket. When the redemption point value is randomly assigned to the game ticket, the redemption point value is randomly selected from a value within the range of 10 to 25 redemption points.

In one embodiment, the pre-set range of redemption point values assigned to a particular game ticket is defined based on a parameter of the game ticket, such as the purchase price of the game ticket or the potential payout value associated with game ticket. For example, a game ticket having a purchase price of $1 may have a redemption point value ranging from 1 to 5 redemption points. $2 game tickets may have a redemption point value ranging from 2 to 25 points. $5 game tickets may have a redemption point value ranging from 5 to 50 points. The pre-set range of redemption point values associated with the game ticket may be structured by the lottery authority to motivate various purchase decisions of the player. For example, the lottery authority may assign a higher range of redemption point values to more favored game tickets. In certain embodiments, the lottery or gaming authority may even assign "double" or "triple" redemption point value ranges to particular game tickets to motivate players to purchase particular game tickets.

Still referring to FIG. 3, a lottery game play is conducted at step 330. In a draw type lottery game, for instance, the lottery game is conducted by holding the drawing. In an instant "scratch-off" type lottery game, the lottery game play is conducted when the player scratches off certain fields on the game ticket according to game rules to reveal a winning event. A player typically knows whether the game ticket is a winning game ticket eligible for a payout value after the lottery game play is conducted.

Figure 5:
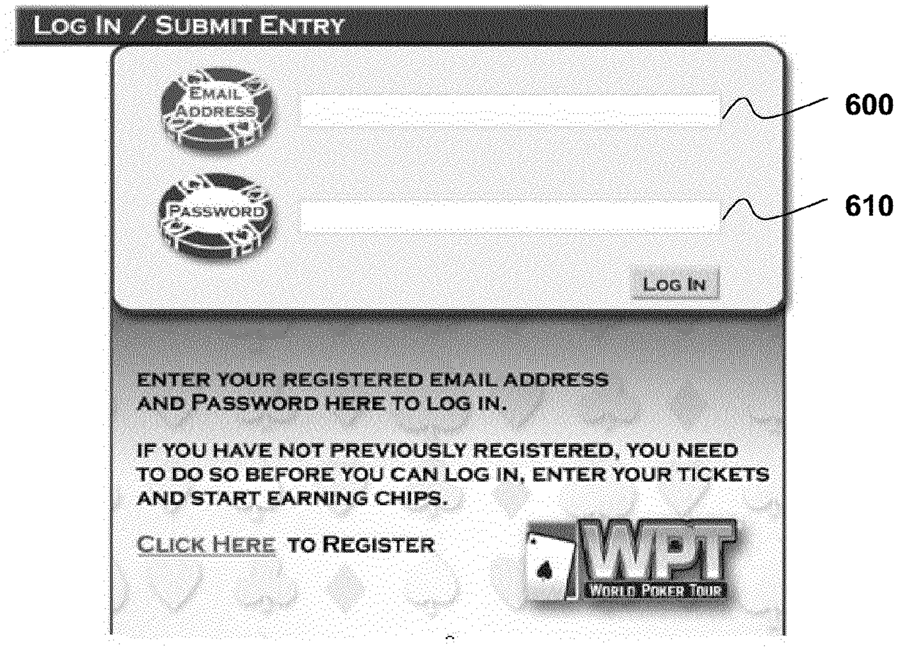
FIGS. 5-7 provide exemplary screen shots of a player interface according to one embodiment of the present invention.
Figure 6:
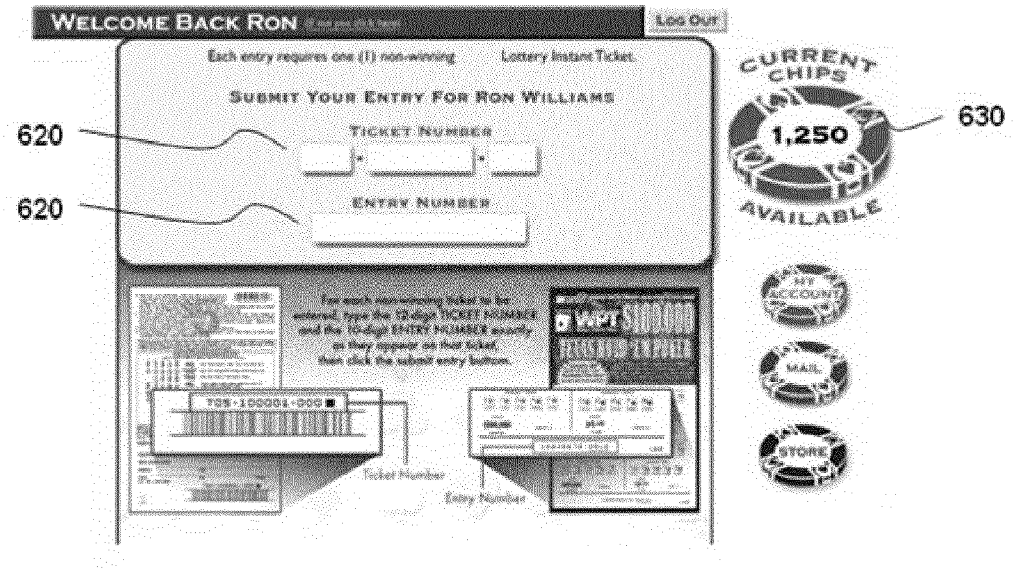

At step 340, the game system 10 receives game ticket data or information. Game ticket data may be input into the game system 10 through a variety of means. In one embodiment, for example, the game ticket information may be entered by a player through a player interface 16. For instance, the player may enter game ticket data by data entry devices integrated or connected with a player interface 16 connected to the lottery system 10 through the Internet. The player may access the system 10 through a secure web site via the Internet. Access to the secure web site can be obtained by entry of a user id and password. FIG. 5 depicts a screen shot of visual display of a player interface 16 prompting a player to enter a user id in the user id field 600 and a password into the password field 610. The user id may be a registered email address of the player or other custom or assigned identifier of the player. Once the player gains access to the lottery system through the secure web site, the player may be prompted to enter the game ticket data or information. For instance, as shown in FIG. 6, the player is prompted to provide the ticket number and entry number of a particular game ticket in fields 620.

In other embodiments, the game ticket data may be input into the game system 10 through a barcode scanner. Each game ticket may include a bar code that contains game ticket data and the redemption point value assigned to the game ticket. The information is input into the system 10 by simply scanning the bar code of the game ticket. In other embodiments, the game ticket data is input into the system 10 at a terminal 14 by the player or at the player's direction. In still other embodiments, the player may input game data into the system by mailing the game ticket to the gaming authority and having the gaming authority input game ticket data into the system 10. Those of ordinary skill in the art should appreciate that the present disclosure is not limited to any particular method or system of inputting game ticket data into the lottery system and that a variety of input methods and systems can be used without deviating from the scope or spirit of the present invention.

Once the system 10 receives game ticket data, the system 10 uses the game ticket data to authenticate the game ticket (step 350) and to determine if the game ticket is a winning ticket (step 360). Game authentication can be performed in a variety of ways known to those of ordinary skill in the art of lottery gaming systems. For instance, game authentication can utilize a variety of authentication codes, encryption techniques or other security measures to ensure the game ticket is an authentic game ticket.

As illustrated at step 370, if the system 10 determines that the game ticket is a winning game ticket eligible for a payout value, the system 10 awards the payout value to the player. The player may redeem the payout value at a variety of locations, for instance, at a terminal, through the mail, at an office for the central gaming authority or at any other location. In some embodiments, the payout value may be directly deposited into a player's bank account or may be deposited into a player's account held with the gaming authority.

If the game ticket is not a winning ticket eligible for the payout value, the system 10 awards the redemption point value associated with the game ticket to the player (step 380). For example, if the redemption point value assigned to the game ticket is 5 redemption points, 5 redemption points are awarded to the player. The redemption points associated with the game ticket may be revealed to the player through a player interface 16 after the system 10 determines the game ticket is not a winning ticket. In this manner, the amount of redemption points associated with a particular game ticket is unknown to the player until the player enters game ticket data into the system 10. At step 390, the awarded redemption point value is credited to the player's redemption point account in a redemption point database.

One aspect of the present invention allows a player to open up an account with the lottery gaming authority to keep track of and "bank" redemption points. As the player accumulates redemption points, the player may exchange any number of redemption points for merchandise, gift certificates, prizes, travel packages or entries into additional lottery games. The player's redemption point account may be established in the lottery system and the redemption point database by registering with the gaming authority.

Figure 4:
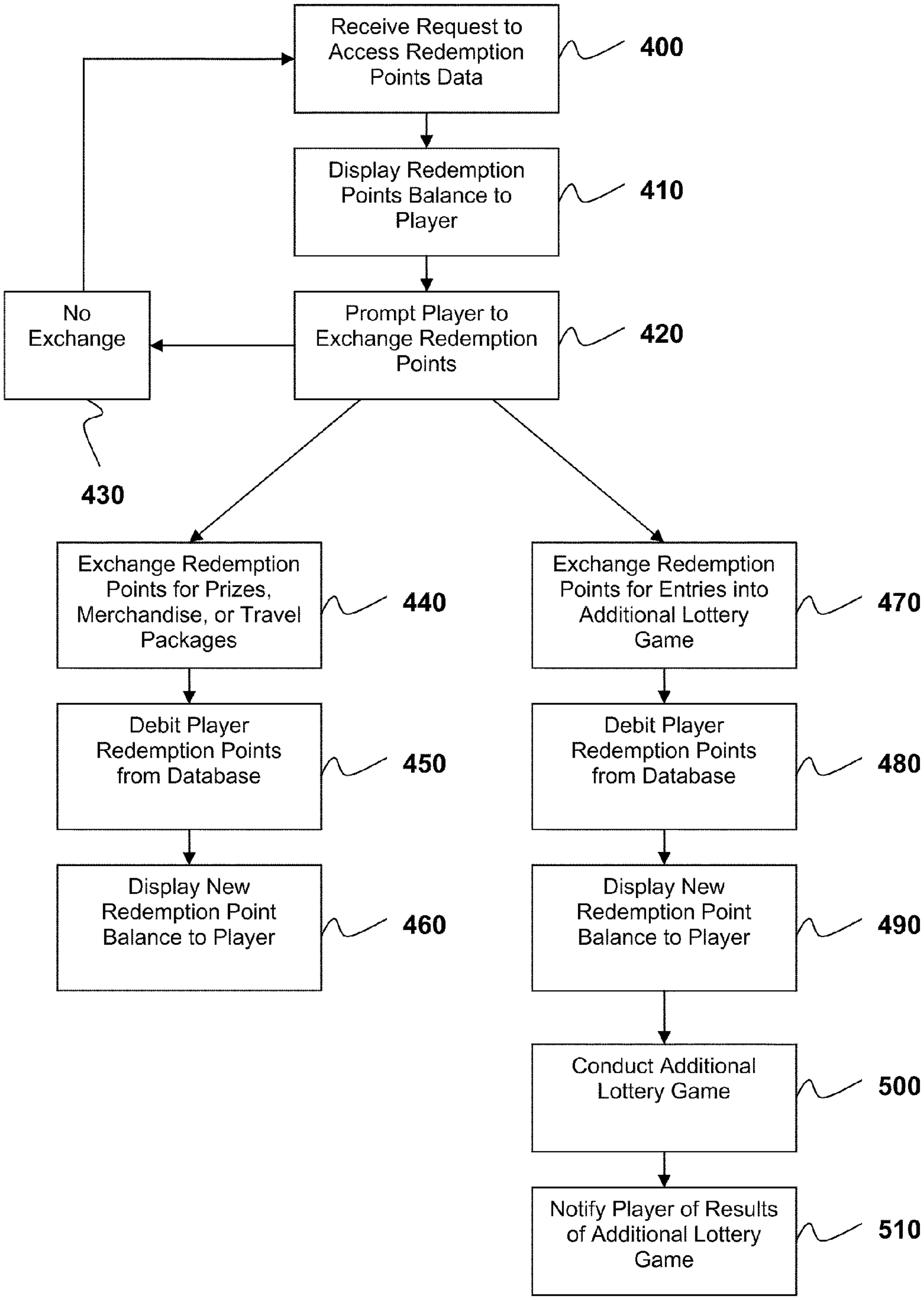
FIG. 4 provides a flow diagram of additional exemplary steps associated with a method according to one embodiment of the present invention.

With reference now to FIG. 4, exemplary steps for tracking and exchanging redemption points through an exemplary rewards program will now be presented. At step 400, the system 10 may receive a request from a player to access redemption point data for the player. The request can be received, for example, from a player interface 16 over the Internet via a secure web site. As shown in FIG. 5, the player may have to log on to the secure web site to access the player's redemption point account.

Once securely logged in, the player interface 16 may display the redemption point data to the player. As shown in FIG. 6, the player's redemption point account balance is displayed at field 630 as "1250." This indicates that the players has "banked" or earned 1250 redemption points that may be exchanged for various merchandise, gift certificates, prizes, travel packages, or entries into additional lottery games.

Figure 7:

Still referring to FIG. 4, step 420 prompts the player to exchange redemption points for various prizes or for entries into an additional lottery game. FIG. 7 depicts an exemplary screen shot of a visual display of a player interface 16 while the system 10 is prompting the player to exchange redemption points. As illustrated, the display at field 640 prompts the player to exchange redemption points for merchandise and at field 650 prompts the player to exchange redemption points for entries into an additional lottery game.

The player may decide to proceed with an exchange or not to exchange redemption points at a particular time. If the player decides not to exchange redemption points (step 430), no redemption points are credited or debited to the player's redemption point account, and the system 10 simply waits for another request by the player to access redemption point data.

At step 440, the redemption points may be exchanged for a variety of merchandise, gift certificates, travel packages or other prizes. For instance, the player may exchange redemption points for any of a variety of apparel, household goods, sporting equipment, electronics, appliances, airline tickets, travel packages, spa packages, golf packages, poker packages, gift certificates, or other items. Using the teachings disclosed herein, those of ordinary skill in the art should recognize that the present invention is not limited to any particular type of merchandise, gift certificate, travel package or other prize available through the redemption point rewards program.

Each item of merchandise, travel package, or other prize will have an associated redemption point value. This redemption point value represents the "cost" of the particular item in terms of redemption points. For example, a particular of apparel may have a redemption point value of 500 redemption points. A player will have to "spend" 500 redemption points in order to exchange redemption points for the particular item of apparel. Once the redemption points are exchanged, the redemption points "spent" on the particular item of merchandise, gift certificate, prize or travel package are debited from the player's redemption point account (step 450). At step 460, the new redemption point balance may be displayed to the player.

In particular embodiments of the present invention, the rewards program may be set up in conjunction with various third party licensing arrangements such that redemption points may be exchanged for licensed products or merchandise. As discussed above, instant "scratch-off" lottery games often have various themes to make the instant "scratch-off" games more entertaining to players. For instance, the games may relate to, for example, professional sports teams, organizations, game shows, tv shows, or other themes. The games are typically sanctioned or licensed by the organizations that own the various intellectual property rights associated with the games, for example logos, trademarks, and other intellectual property. NASCAR® licensed instant lottery games are a well known example of a sponsored or licensed game. The system and methods of the present invention may permit users to exchange redemption points for third party licensed products containing logos, trademarks and so forth of the third party. For example, redemption points may be exchanged for various NASCAR® merchandise or products.

By allowing a player to exchange redemption points for particular items of merchandise, gift certificates, or prizes, the redemption point rewards program of the present invention allows players to turn losing game tickets into redeemable prizes. Thus, players frustrated with never winning a lottery game may still be motivated to participate in the lottery games because of the opportunity to earn redemption point rewards.

Referring still to FIG. 4, redemption points may also be exchanged for entries into an additional lottery game (step 470). The additional lottery game may be any type of lottery game, such as a draw type lottery game or an instant lottery game. The player "buys" one or more entries for the additional lottery game with redemption points. At step 480, the redemption points spent by the player are debited from the players redemption point account and at step 490 the new balance may be displayed to the user.

In one particular embodiment, the additional lottery game may be a drawing for a grand prize or sweepstakes-like drawing. The grand prize may be a car, boat, travel package, cash prize, or any other prize. The player exchanges redemption points for entries into a drawing for the grand prize. At a subsequent drawing, the lottery gaming authority randomly draws an entry from the plurality of entries entered into the lottery game. The player having the drawn entry wins the grand prize. The more entries the player has in the drawing, the greater the chance of success the player has at winning the grand prize. Thus, players who have earned a greater number of redemption points have the ability to buy a greater number of entries into the grand prize drawing and thus have a greater chance of winning the grand prize.

In another embodiment, the additional lottery game may be used in conjunction with an instant "scratch-off" lottery game. In this embodiment, the instant lottery game may have a prize structure in which at least one prize from the lottery game is reserved as a final prize for the instant lottery game. A player may exchange redemption points for entries in a drawing for the final prize of the instant lottery game. At a subsequent drawing, the lottery gaming authority randomly draws an entry from the plurality of entries entered into the lottery game. The player with the drawn entry wins the final prize. As discussed above, the more entries the player has in the drawing for the final prize, the greater the chance of success the player has at winning the final prize. Thus, players who have earned a greater number of redemption points have the ability to buy a greater number of entries into the final prize drawing and thus have a greater chance of winning the final prize.

By allowing a player to exchange redemption points for entries into an additional lottery game, the redemption points based rewards program of the present invention allows players to turn losing game tickets into opportunities for success in other lottery games. Thus, players frustrated with never winning a lottery game may still be motivated to participate in the lottery games because of the opportunity to win additional lottery games through exchange of redemption points associated with losing game tickets.

The system and method of the present invention may be used or modified in a variety ways to motivate players towards preferred purchase decisions or actions. For instance, in one embodiment, the rewards program may be used in conjunction with an anti-litter program. In this embodiment, a player may be awarded redemption points when the player physically returns a game ticket to a terminal. The operator of the terminal can then ensure that the game ticket is disposed of properly. In this manner, players are encouraged to return used game tickets to a terminal location instead of disposing the game tickets improperly as litter.

In another embodiment, the system and method of the present invention may be used to motivate a player towards purchasing a particular game ticket. For instance, sales of game tickets for a particular instant "scratch-off" lottery game may be down due to decreased interest in the game. The central lottery authority may decide to grant players "double" or "triple" redemption points for participating in the particular game to boost interest in the game.

In still other embodiments, the lottery authority may hold an additional bonus lottery game to give away prizes based on redemption points that have not yet been exchanged by the player. In this embodiment, the system 10 determines the number of redemption points available in a particular player's redemption point account. The lottery system 10 uses the unredeemed or unexchanged redemption points in the players redemption point account as a basis for entries into the additional bonus lottery game. The higher the number of unredeemed redemption points in the player's redemption point account, the greater the player's chance of success in the additional bonus lottery game. This embodiment may be used to encourage players to hold on to redemption points for extended periods of time instead of exchanging the redemption points immediately for merchandise, gift certificates, prizes, travel packages or entries into additional lottery games.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lottery gaming system for implementing a redemption points based lottery rewards program, the lottery gaming system comprising:

a point of sale (POS) location for providing a game ticket to a player for use in a lottery game play, the lottery game play having a payout value for winning game tickets;

the game ticket having a randomly determined redemption point value assigned thereto, the redemption point value comprising at least one redemption point for use in the lottery rewards program;

a player interface configured to permit a player to enter game ticket information into the lottery gaming system;

a controller configured to determine whether the game ticket is a winning game ticket eligible for the payout value of the lottery game play, the controller configured to award the randomly determined redemption point value of the game ticket to the player only when the game ticket is not a winning ticket;

a redemption point database configured to store and accumulate the awarded redemption points in a player redemption point account; and wherein the player subsequently interfaces with the controller to choose how to exchange their accumulated redemption points for a reward in the lottery rewards program, such that the player controls how the accumulated redemption points are used; and wherein an additional bonus lottery game is conducted to provide prizes based on accumulated redemption points that have not been exchanged by the player.

2. The lottery gaming system of claim 1, wherein the player interface is configured to permit the player to track the number of redemption points awarded to the player stored in the redemption point database.

3. The lottery gaming system of claim 1, wherein the player interface is configured to permit the player to exchange redemption points for merchandise, gift certificates, prizes or travel packages.

4. The lottery gaming system of claim 1, wherein the player interface is configured to permit the player to exchange redemption points for entries in an additional lottery game.

5. The lottery gaming system of claim 4, wherein the additional lottery game is a drawing for a grand prize.

6. The lottery gaming system of claim 1, wherein the game ticket is for use in an instant lottery game with each game ticket embodying a single play of the instant lottery game, the instant lottery game having a prize structure in which a prize from each instant lottery game is reserved as a final prize for the instant lottery game, the player interface configured to permit the player to exchange redemption points for entries in a drawing for the final prize of the instant lottery game.

7. The lottery gaming system of claim 1, wherein the controller is configured to award redemption points to the player when the player physically returns the game ticket to the lottery terminal.

8. A gaming method for use in a redemption points lottery rewards program, the method comprising:

at a point of sale (POS) location, issuing a game ticket to a player, the game ticket for use in a lottery game play, the lottery game play having a payout value for winning game tickets;

assigning a randomly determined redemption point value to the game ticket, the redemption point value comprising at least one redemption point for use in the lottery rewards program;

receiving game ticket data, the game ticket data used to determine the redemption point value assigned to the game ticket;

determining if the game ticket is a winning game ticket eligible for the payout value of the lottery game play;

awarding the randomly determined redemption point value of the game ticket to the player only when the game ticket is not a winning ticket eligible for the payout value;

storing and accumulating the awarded redemption points of the player in a player redemption point account database;

at the player's request allowing the player to choose how to exchange the player's accumulated redemption points for a reward in the lottery rewards program, such that the player controls how the accumulated redemption points are used; and wherein an additional bonus lottery game is conducted to provide prizes based on accumulated redemption points that have not been exchanged by the player.

9. The gaming method of claim 8, wherein the method comprises displaying at a player interface the number of redemption points awarded to the player stored in the redemption point database system.

10. The gaming method of claim 8, wherein the method comprises exchanging redemption points for merchandise, gift certificates, prizes or travel packages.

11. The gaming method of claim 8, wherein the method comprises exchanging the redemption points for entries in an additional lottery game.

12. The gaming method of claim 11, wherein the additional lottery game is a drawing for a grand prize.

13. The gaming method of claim 8, wherein the game ticket is for use in an instant lottery game with each game ticket embodying a single play of the instant lottery game, the method comprising:

reserving a prize from the instant lottery game as a final prize for the instant lottery game;

exchanging redemption points for entries in a drawing for the final prize;

awarding the final prize to the winning entry.

14. The gaming method of claim 8, wherein the method comprises awarding redemption points to the player when the player physically returns the game ticket to the lottery terminal.

* * * * *